Aug. 2, 1932.  F. E. DE VORE  1,869,412
BEARING
Filed Oct. 29, 1928
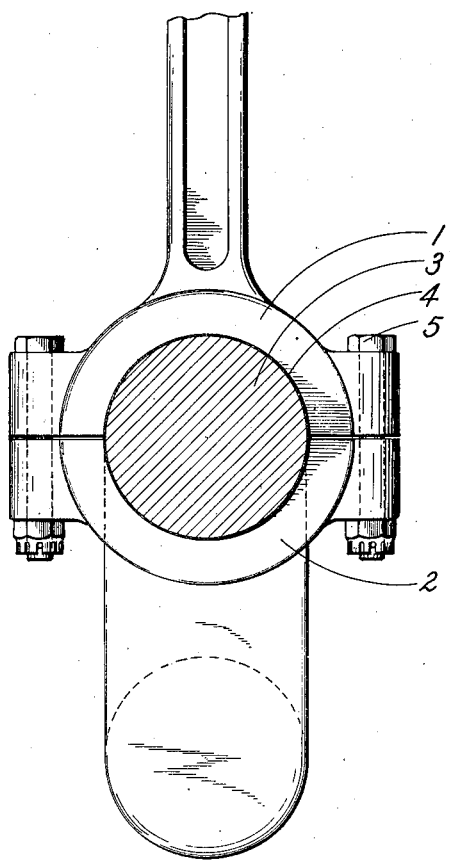
INVENTOR
Francis E. De Vore
BY
Richey & Watts
ATTORNEYS Patented Aug. 2, 1932

1,869,412

UNITED STATES PATENT OFFICE

FRANCIS E. DE VORE, OF WASHINGTON, DISTRICT OF COLUMBIA, ASSIGNOR TO ALUMINUM COMPANY OF AMERICA, OF PITTSBURGH, PENNSYLVANIA, A CORPORATION OF PENNSYLVANIA

BEARING

Application filed October 29, 1928. Serial No. 315,759.

This invention relates to improvements in bearings of which aluminum alloy or like metal constitutes one of the members and chromium the other. At present, the principal application thereof seems to be to the bearing between the crank shaft and the connecting rod in internal combustion engines or the like.

It has heretofore been the usual practice, so far as I am informed, when connecting rods are made of aluminum alloy, to form a bearing on the crank shaft end of the connecting rod of Babbitt metal or some such bearing material. This is found to be objectionable, so I am informed, for a number of reasons. One reason is that the end of the connecting rod has to be heated in the installation of the Babbitt or other bearing metal and during such heating the tensile strength and other desirable properties of the rod are reduced or otherwise modified so as to injure or reduce the efficiency of the rod. To meet this situation the rods are often made over-size and over-weight which, while making the rod strong enough, is objectionable for several other reasons.

Another difficulty with bearings of this nature results from the fact that at high temperatures sometimes the aluminum connecting rod expands away from the crank shaft leaving space between the two with the result that the connecting rod rattles on the crank shaft, hammering upon and cracking the Babbitt metal bearings, causing portions of it to drop out and thus eventually destroying the bearing.

Still another objection to this type of bearing is that the Babbitt metal bearing offers considerable resistance to the flow of heat from the bearing and interferes with the very desirable rapid conduction of heat from the bearing by the aluminum alloy connecting rod which has, due to the material of which it is made, a relatively high heat conductivity.

Efforts have been made to overcome these difficulties as, for example, by the use of steel, or other like metal, bearing direct to aluminum, but the aluminum often seizes on the other metal, making it impracticable to use such a bearing.

One of the purposes of my invention is to overcome these difficulties and to produce a bearing including aluminum alloy which is free from such objections.

The invention will be better understood from the description of one practical embodiment thereof illustrated in the accompanying drawing in which the figure is a fragmentary view, partly in section, showing the lower end of a connecting rod and its connection with one throw of the crank shaft of an engine or the like.

One of my bearing members consists of aluminum alloy or like metal. The other member consists of chromium and is best formed by plating the base metal of the bearing with chromium plate. This is best done by electrolytically depositing chromium upon the base to a suitable thickness. Preferably, the chromium plating is not more than one-thousandth of an inch in thickness. The base metal, though generally of iron or steel, may be whatever metal is best suited in the particular surroundings. Chromium and the metals and alloys I have named have small affinity for each other and if properly lubricated there is no danger of seizure between such bearing members. By my invention I dispose of the necessity of using Babbitt or other bearing metal on the aluminum and cause the aluminum to bear directly with the chromium plating. I thus dispose of any necessity of heating or otherwise treating the aluminum for the purpose of facilitating the installation of the Babbitt or other bearing material so that I can be certain that the original properties imparted to the aluminum by heat treatment will not be disturbed. Where my invention is used with connecting rods, I can also reduce the size of the connecting rods because it is no longer necessary to make them over-size or over-weight to compensate for the reduction in tensile strength and the like, resulting from the heating or other treating of the same incident to the installation of bearings used before my invention. There is, of course, no longer any danger of breaking the bearing and knocking the parts out. Also by running the aluminum direct against the chromium plated shaft I get the full benefit of the ability of the aluminum to conduct the heat away from the bearing and thus maintaining a lower bearing temperature. I also find that the friction between the bearings is much less in my invention than in older constructions.

In the drawing the lower end of a connecting rod is shown as formed to constitute the upper half 1 of a journal, this portion cooperating with a bearing cap 2, these parts being composed of aluminum alloy. The two parts of the journal surround a crank 3 of the engine crankshaft, this being provided upon its exterior with a thin plating of chromium indicated at 4. The parts of the journal are held together by means of bolts 5 in a well known manner. Shims may be provided between the halves of a journal, as is well understood in this art, and it will be obvious that the aluminum contacts only the thin chromium shell of the crank, producing a bearing of the kind above described.

The construction of the rods is much easier and cheaper since the processes incurred in mounting the special bearings in the rods are eliminated, as well as the labor incident thereto and the bearing itself. Moreover, the Babbitt bearing is at best transitory while my bearing is permanent.

I have used the term "aluminum" in this specification and claims in the sense in which it is frequently used commercially to include various alloys of the metal aluminum.

While I have cited as a specific example as best illustrating the advantages and the utility of my invention the bearing between the connecting rod and the crank shaft of an internal combustion engine, nevertheless, I do not wish to be limited thereto except where such limitations have been expressly included in the claims. It is manifest that I do not want to be limited to the particular embodiments of my invention which I have described. It is equally manifest that many variations may be made from the embodiments described without departing from the spirit of my invention.

I claim:

1. In combination, a connecting rod for an internal combustion engine made of aluminum with a cylindrical aluminum bearing in the base thereof normally in direct contacting engagement with a companion cylindrical bearing consisting of chromium, plated on a steel crank pin of the crank shaft of the internal combustion engine, one of said bearings adapted to turn on the other.

2. In combination, a connecting rod of an internal combustion engine made of aluminum and having a cylindrical bearing of aluminum in the crank end thereof, and the crank shaft of an internal combustion engine having a crank pin whose outer surface is composed of chromium and normally in direct contacting engagement with the aluminum bearing of the connecting rod.

3. In combination, an aluminum connecting rod of an internal combustion engine having a cylindrical aluminum bearing in the crank end thereof and a companion cylindrical bearing of chromium constituting a cylindrical bearing within the aluminum bearing and a crank pin of the crank shaft of the internal combustion engine upon which said chromium bearing is mounted, the latter bearing turning within the aluminum bearing when the engine operates.

4. An aluminum connecting rod having an aluminum bearing integral with the connecting rod to engage and oscillate upon the crank pin of a crank shaft of an internal combustion engine, a crank pin of a crank shaft of an internal combustion engine having a chromium bearing to engage and oscillate on the connecting rod of said engine.

5. In combination, a crankshaft having a crank pin the outer surface of which is composed of chromium, and a heat-treated, hardened, aluminum alloy connecting rod having a cylindrical bearing surface of the same material as the remainder of the rod mounted on said crank pin and arranged to bear directly on said chromium surface.

6. In an internal combustion engine, a steel crankshaft having a crank pin coated with a layer of chromium, and a heat-treated, hardened, aluminum alloy connecting rod having a cylindrical bearing surface formed of the same material and of the same hardness as the remainder of the rod mounted on said crank pin, and arranged to bear directly on said layer of chromium.

7. In combination, a cylindrical steel pin having a cylindrical chromium bearing surface thereon, and a heat treated, hardened, aluminum alloy connecting rod having a cylindrical bearing surface of the same material as the remainder of the rod mounted on said pin and arranged to bear directly on said chromium surface.

8. In an internal combustion engine, in combination, a crank shaft, a member for transmitting explosive forces in said engine to said crank shaft composed of heat treated, hardened aluminum alloy and having a cylindrical bearing surface of the same material as the remainder of the member, and a steel pin having a cylindrical chromium bearing surface thereon bearing directly on the cylindrical bearing surface of said member.

In testimony whereof I hereunto affix my signature this 5th day of October, 1928.

FRANCIS E. DE VORE.